(12) United States Patent
Abfall et al.

(10) Patent No.: US 12,522,243 B2
(45) Date of Patent: Jan. 13, 2026

(54) VISION-BASED SYSTEM TRAINING WITH SIMULATED CONTENT

(71) Applicant: Tesla, Inc., Austin, TX (US)

(72) Inventors: David Abfall, Austin, TX (US); Michael Hosticka, Austin, TX (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/684,607

(22) PCT Filed: Aug. 18, 2022

(86) PCT No.: PCT/US2022/040793
§ 371 (c)(1),
(2) Date: Feb. 16, 2024

(87) PCT Pub. No.: WO2023/023272
PCT Pub. Date: Feb. 23, 2023

(65) Prior Publication Data
US 2024/0378899 A1    Nov. 14, 2024

Related U.S. Application Data

(60) Provisional application No. 63/287,936, filed on Dec. 9, 2021, provisional application No. 63/260,439, filed on Aug. 19, 2021.

(51) Int. Cl.
*B60W 60/00* (2020.01)
*G06T 7/13* (2017.01)
(Continued)

(52) U.S. Cl.
CPC ............ *B60W 60/001* (2020.02); *G06T 7/13* (2017.01); *G06T 7/20* (2013.01); *G06V 10/774* (2022.01);
(Continued)

(58) Field of Classification Search
CPC ......... B60W 60/001; B60W 2420/403; B60W 2552/53; G06T 7/13; G06T 7/20;
(Continued)

(56) References Cited

U.S. PATENT DOCUMENTS 6,882,755 B2    4/2005 Silverstein et al.
7,209,031 B2    4/2007 Nakai et al.
(Continued)

FOREIGN PATENT DOCUMENTS

AU    2019261735 A1    5/2016
AU    2019201716 A1    10/2020
(Continued)

OTHER PUBLICATIONS

International Preliminary Report on Patentability on PCT/US2022/040784 Dtd Feb. 29, 2024 (10 pages).
(Continued)

*Primary Examiner* — Gims S Philippe
(74) *Attorney, Agent, or Firm* — Foley & Lardner LLP

(57) ABSTRACT

Aspects of the present application correspond to utilization of a combined set of inputs from simulation systems to generate or train machine learned algorithms for utilization in vehicles with vision system-only based processing. Aspects of the present application correspond to utilization of a set of inputs from sensors or sensing systems and simulation systems to create updated training sets for use in machine learning algorithms. The combined set of inputs includes a first set of data corresponding to vision system from a plurality of cameras configured in a vehicle. The combined set of inputs further includes a second set of data corresponding to simulated content systems that generate additional training set data including visual images and data labels to supplement the vision system data.

24 Claims, 10 Drawing Sheets

(51) Int. Cl.
  *G06T 7/20* (2017.01)
  *G06V 10/774* (2022.01)
  *G06V 20/56* (2022.01)
  *G06V 20/58* (2022.01)
  *G06V 20/70* (2022.01)

(52) U.S. Cl.
  CPC .............. *G06V 20/56* (2022.01); *G06V 20/58* (2022.01); *G06V 20/588* (2022.01); *G06V 20/70* (2022.01); *B60W 2420/403* (2013.01); *B60W 2552/53* (2020.02); *G06T 2207/20081* (2013.01); *G06T 2207/30241* (2013.01); *G06T 2207/30252* (2013.01)

(58) Field of Classification Search
  CPC . G06T 2207/30241; G06T 2207/30252; G06T 2207/20081; G06V 10/774; G06V 20/56; G06V 20/588; G06V 20/70; G06V 10/776; G06V 20/58; G06N 3/09
  See application file for complete search history.

(56) References Cited

U.S. PATENT DOCUMENTS

| | | | |
|---|---|---|---|
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle |
| 8,509,478 B2 | 8/2013 | Haas et al. |
| 8,588,470 B2 | 11/2013 | Rodriguez Serrano et al. |
| 8,744,174 B2 | 6/2014 | Hamada et al. |
| 8,773,498 B2 | 7/2014 | Lindbergh |
| 8,874,266 B1 | 10/2014 | Francis et al. |
| 8,912,476 B2 | 12/2014 | Fogg |
| 8,913,830 B2 | 12/2014 | Sun et al. |
| 8,928,753 B2 | 1/2015 | Han et al. |
| 8,972,095 B2 | 3/2015 | Furuno |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | Mccarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks |
| 10,242,293 B2 | 3/2019 | Shim |
| 10,248,121 B2 | 4/2019 | Vandenberg |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel |
| 10,310,087 B2 | 6/2019 | Laddha et al. |
| 10,311,312 B2 | 6/2019 | Yu |
| 10,318,848 B2 | 6/2019 | Dijkman et al. |
| 10,325,178 B1 | 6/2019 | Tang |
| 10,331,974 B2 | 6/2019 | Zia et al. |
| 10,338,600 B2 | 7/2019 | Yoon et al. |
| 10,343,607 B2 | 7/2019 | Kumon |
| 10,359,783 B2 | 7/2019 | Williams et al. |
| 10,366,290 B2 | 7/2019 | Wang |
| 10,372,130 B1 | 8/2019 | Kaushansky et al. |
| 10,373,019 B2 | 8/2019 | Nariyambut Murali et al. |
| 10,373,026 B1 | 8/2019 | Kim |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp |
| 10,423,934 B1 | 9/2019 | Zanghi et al. |
| 10,436,615 B2 | 10/2019 | Agarwal et al. |
| 10,452,905 B2 | 10/2019 | Segalovitz |
| 10,460,053 B2 | 10/2019 | Olson et al. |
| 10,467,459 B2 | 11/2019 | Chen |
| 10,468,008 B2 | 11/2019 | Beckman et al. |
| 10,468,062 B1 | 11/2019 | Levinson |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | N |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neumann |
| 10,565,475 B2 | 2/2020 | Lecue |
| 10,567,674 B2 | 2/2020 | Kirsch |
| 10,568,570 B1 | 2/2020 | Sherpa |
| 10,572,717 B1 | 2/2020 | Zhu |
| 10,574,905 B2 | 2/2020 | Srikanth et al. |
| 10,579,058 B2 | 3/2020 | Oh |
| 10,579,063 B2 | 3/2020 | Haynes et al. |
| 10,579,897 B2 | 3/2020 | Redmon et al. |
| 10,586,280 B2 | 3/2020 | Mckenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai |
| 10,614,344 B2 | 4/2020 | Anthony et al. |
| 10,621,513 B2 | 4/2020 | Deshpande |
| 10,627,818 B2 | 4/2020 | Sapp et al. |
| 10,628,432 B2 | 4/2020 | Guo |
| 10,628,686 B2 | 4/2020 | Ogale et al. |
| 10,628,688 B1 | 4/2020 | Kim et al. |
| 10,629,080 B2 | 4/2020 | Kazemi |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang |
| 10,656,657 B2 | 5/2020 | Djuric |
| 10,657,391 B2 | 5/2020 | Chen et al. |
| 10,657,418 B2 | 5/2020 | Marder |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,684,626 B1 | 6/2020 | Martin |
| 10,685,159 B2 | 6/2020 | Su |
| 10,685,188 B1 | 6/2020 | Zhang et al. |

(56) References Cited

U.S. PATENT DOCUMENTS

| | | |
|---|---|---|
| 10,692,000 B2 | 6/2020 | Surazhsky |
| 10,692,242 B1 | 6/2020 | Morrison et al. |
| 10,693,740 B2 | 6/2020 | Coccia |
| 10,698,868 B2 | 6/2020 | Guggilla |
| 10,699,119 B2 | 6/2020 | Lo et al. |
| 10,699,140 B2 | 6/2020 | Kench et al. |
| 10,699,477 B2 | 6/2020 | Levinson |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer |
| 10,732,261 B1 | 8/2020 | Wang et al. |
| 10,733,262 B2 | 8/2020 | Miller et al. |
| 10,733,482 B1 | 8/2020 | Lee et al. |
| 10,733,506 B1 | 8/2020 | Ogale et al. |
| 10,733,638 B1 | 8/2020 | Jain et al. |
| 10,733,755 B2 | 8/2020 | Liao et al. |
| 10,733,876 B2 | 8/2020 | Moura |
| 10,740,563 B2 | 8/2020 | Dugan |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi-Gonzalez et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao |
| 10,769,525 B2 | 9/2020 | Redding et al. |
| 10,776,626 B1 | 9/2020 | Lin et al. |
| 10,776,673 B2 | 9/2020 | Kim |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi-Gonzalez et al. |
| 10,817,732 B2 | 10/2020 | Porter et al. |
| 10,819,923 B1 | 10/2020 | Mccauley |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova |
| 10,832,414 B2 | 11/2020 | Pfeiffer |
| 10,832,418 B1 | 11/2020 | Karasev |
| 10,833,785 B2 | 11/2020 | O'Shea et al. |
| 10,836,379 B2 | 11/2020 | Xiao |
| 10,838,936 B2 | 11/2020 | Cohen |
| 10,839,230 B2 | 11/2020 | Charette et al. |
| 10,839,578 B2 | 11/2020 | Coppersmith, III |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al Shehri et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado Bataller et al. |
| 10,908,068 B2 | 2/2021 | Amer et al. |
| 10,908,606 B2 | 2/2021 | Stein et al. |
| 10,909,368 B2 | 2/2021 | Guo |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 10,990,826 B1 | 4/2021 | Haider et al. |
| 11,157,287 B2 | 10/2021 | Talpes et al. |
| 11,157,441 B2 | 10/2021 | Talpes et al. |
| 11,282,235 B2 | 3/2022 | Torikura et al. |
| 11,295,180 B1* | 4/2022 | Tolstov .................. G06V 20/70 |
| 11,409,692 B2 | 8/2022 | Das Sarma et al. |
| 11,615,223 B2 | 3/2023 | Taralova |
| 11,625,041 B2 | 4/2023 | Das et al. |
| 11,921,824 B1 | 3/2024 | Hester et al. |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2009/0016571 A1 | 1/2009 | Tijerina |
| 2010/0118157 A1 | 5/2010 | Ushijima et al. |
| 2012/0109915 A1 | 5/2012 | Kamekawa |
| 2012/0110491 A1 | 5/2012 | Cheung |
| 2012/0134595 A1 | 5/2012 | Fonseca et al. |
| 2014/0003709 A1* | 1/2014 | Ranganathan ....... G06V 20/588 |
| | | 382/201 |
| 2014/0093176 A1 | 4/2014 | Maeda et al. |
| 2014/0270362 A1 | 9/2014 | Najafi Shoushtari et al. |
| 2015/0104102 A1 | 4/2015 | Carreira |
| 2016/0003636 A1 | 1/2016 | Ng-Thow-Hing et al. |
| 2016/0132786 A1 | 5/2016 | Balan et al. |
| 2016/0180197 A1 | 6/2016 | Kim et al. |
| 2016/0307071 A1 | 10/2016 | Perronnin et al. |
| 2016/0328856 A1 | 11/2016 | Mannino |
| 2017/0011281 A1 | 1/2017 | Dijkman |
| 2017/0158134 A1 | 6/2017 | Shigemura |
| 2017/0206434 A1 | 7/2017 | Nariyambut Murali et al. |
| 2018/0012411 A1 | 1/2018 | Richey et al. |
| 2018/0018590 A1 | 1/2018 | Szeto et al. |
| 2018/0039853 A1 | 2/2018 | Liu |
| 2018/0067489 A1 | 3/2018 | Oder et al. |
| 2018/0068459 A1 | 3/2018 | Zhang |
| 2018/0068540 A1 | 3/2018 | Romanenko et al. |

(56) References Cited

U.S. PATENT DOCUMENTS

| | | |
|---|---|---|
| 2018/0074506 A1 | 3/2018 | Branson |
| 2018/0121762 A1 | 5/2018 | Han |
| 2018/0150081 A1 | 5/2018 | Gross et al. |
| 2018/0189578 A1 | 7/2018 | Yang et al. |
| 2018/0203456 A1 | 7/2018 | Nagasaka et al. |
| 2018/0211403 A1 | 7/2018 | Hotson et al. |
| 2018/0308012 A1 | 10/2018 | Mummadi |
| 2018/0314878 A1 | 11/2018 | Lee et al. |
| 2018/0348346 A1 | 12/2018 | Vallespi-Gonzalez et al. |
| 2018/0357492 A1 | 12/2018 | Allen et al. |
| 2018/0357511 A1 | 12/2018 | Misra |
| 2018/0374105 A1 | 12/2018 | Azout et al. |
| 2019/0023277 A1 | 1/2019 | Roger |
| 2019/0025773 A1 | 1/2019 | Yang et al. |
| 2019/0026250 A1 | 1/2019 | Das Sarma et al. |
| 2019/0042894 A1 | 2/2019 | Anderson |
| 2019/0042919 A1 | 2/2019 | Peysakhovich et al. |
| 2019/0042944 A1 | 2/2019 | Nair |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Dan et al. |
| 2019/0079526 A1 | 3/2019 | Vallespi-Gonzalez et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0096256 A1 | 3/2019 | Rowell |
| 2019/0101914 A1 | 4/2019 | Coleman et al. |
| 2019/0108417 A1 | 4/2019 | Talagala et al. |
| 2019/0122111 A1 | 4/2019 | Min |
| 2019/0130255 A1 | 5/2019 | Yim |
| 2019/0145765 A1 | 5/2019 | Luo et al. |
| 2019/0146497 A1 | 5/2019 | Urtasun |
| 2019/0146519 A1 | 5/2019 | Miura et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0156485 A1 | 5/2019 | Pfeiffer |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari Tafti et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0232955 A1 | 8/2019 | Grimm et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0251397 A1 | 8/2019 | Tremblay et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon |
| 2019/0286652 A1 | 9/2019 | Habbecke et al. |
| 2019/0286972 A1 | 9/2019 | El Husseini et al. |
| 2019/0287028 A1 | 9/2019 | St. Amant et al. |
| 2019/0289281 A1 | 9/2019 | Badrinarayanan et al. |
| 2019/0294177 A1 | 9/2019 | Kwon |
| 2019/0294975 A1 | 9/2019 | Sachs |
| 2019/0303759 A1 | 10/2019 | Farabet et al. |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos, Jr. et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0000057 A1 | 1/2020 | Niemela et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao et al. |
| 2020/0033865 A1 | 1/2020 | Mellinger, III |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu |
| 2020/0051550 A1 | 2/2020 | Baker |
| 2020/0057487 A1 | 2/2020 | Sicconi et al. |
| 2020/0060757 A1 | 2/2020 | Ben-Haim |
| 2020/0065711 A1 | 2/2020 | Clément |
| 2020/0065879 A1 | 2/2020 | Hu |
| 2020/0069973 A1 | 3/2020 | Lou |
| 2020/0073385 A1 | 3/2020 | Jobanputra |
| 2020/0074230 A1 | 3/2020 | England |
| 2020/0074266 A1 | 3/2020 | Peake et al. |
| 2020/0086880 A1 | 3/2020 | Poeppel |
| 2020/0089243 A1 | 3/2020 | Poeppel |
| 2020/0089969 A1 | 3/2020 | Lakshmi Narayanan |
| 2020/0090056 A1 | 3/2020 | Singhal |
| 2020/0097841 A1 | 3/2020 | Ioannis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella |
| 2020/0117889 A1 | 4/2020 | Laput |
| 2020/0117916 A1 | 4/2020 | Liu |
| 2020/0117917 A1 | 4/2020 | Yoo |
| 2020/0118035 A1 | 4/2020 | Asawa |
| 2020/0118294 A1 | 4/2020 | Nakao et al. |
| 2020/0125112 A1 | 4/2020 | Mao et al. |
| 2020/0125844 A1 | 4/2020 | She |

(56) References Cited

U.S. PATENT DOCUMENTS

| | | |
|---|---|---|
| 2020/0125845 A1 | 4/2020 | Hess |
| 2020/0126129 A1 | 4/2020 | Lkhamsuren |
| 2020/0134379 A1* | 4/2020 | Gaidon ............... G06F 18/2155 |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip Leon et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo Abolfathi et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | Remine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | Du Toit et al. |
| 2020/0218722 A1 | 7/2020 | Mai et al. |
| 2020/0218910 A1 | 7/2020 | Herman |
| 2020/0218979 A1 | 7/2020 | Kwon et al. |
| 2020/0223434 A1 | 7/2020 | Campos Macias et al. |
| 2020/0225758 A1 | 7/2020 | Tang et al. |
| 2020/0226377 A1 | 7/2020 | Campos Macias et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242479 A1 | 7/2020 | Kim et al. |
| 2020/0242511 A1 | 7/2020 | Kale et al. |
| 2020/0245654 A1 | 8/2020 | Zhu et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi Mohammadabadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0307578 A1 | 10/2020 | Magolan et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov |
| 2020/0315708 A1 | 10/2020 | Mosnier |
| 2020/0320132 A1 | 10/2020 | Neumann |
| 2020/0324073 A1 | 10/2020 | Rajan Kesavelu Shekar et al. |
| 2020/0327192 A1 | 10/2020 | Hackman et al. |
| 2020/0327443 A1 | 10/2020 | Van Vredendaal et al. |
| 2020/0327449 A1 | 10/2020 | Tiwari et al. |
| 2020/0327662 A1 | 10/2020 | Liu et al. |
| 2020/0327667 A1 | 10/2020 | Arbel |
| 2020/0331476 A1 | 10/2020 | Chen et al. |
| 2020/0334416 A1 | 10/2020 | Vianu et al. |
| 2020/0334495 A1 | 10/2020 | Al-Rfou et al. |
| 2020/0334501 A1 | 10/2020 | Lin et al. |
| 2020/0334551 A1 | 10/2020 | Javidi |
| 2020/0334574 A1 | 10/2020 | Ishida |
| 2020/0337648 A1 | 10/2020 | Saripalli et al. |
| 2020/0339109 A1 | 10/2020 | Hong et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0394911 A1 | 12/2020 | Harmel et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0409364 A1 | 12/2020 | Agrawal |

(56) References Cited

U.S. PATENT DOCUMENTS

| | | |
|---|---|---|
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | Mcgavran et al. |
| 2021/0027657 A1 | 1/2021 | Becker |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |
| 2021/0163031 A1* | 6/2021 | Jagbrant ............... G06V 10/764 |
| 2021/0233390 A1 | 7/2021 | Georgiou et al. |
| 2021/0263157 A1* | 8/2021 | Zhu ........................ G01S 17/89 |
| 2021/0271259 A1 | 9/2021 | Karpathy |
| 2021/0271898 A1 | 9/2021 | Chen et al. |
| 2021/0276574 A1 | 9/2021 | Efrat Sela et al. |
| 2021/0302992 A1 | 9/2021 | Chen et al. |
| 2021/0303922 A1 | 9/2021 | Tu et al. |
| 2021/0342609 A1 | 11/2021 | Smolyanskiy et al. |
| 2021/0358137 A1 | 11/2021 | Lee et al. |
| 2021/0406560 A1 | 12/2021 | Park et al. |
| 2022/0044034 A1 | 2/2022 | Roychowdhury et al. |
| 2022/0083785 A1 | 3/2022 | Subramanian et al. |
| 2022/0092349 A1* | 3/2022 | Yang ........................ G06T 15/20 |
| 2022/0156525 A1 | 5/2022 | Guizilini et al. |
| 2022/0185625 A1 | 6/2022 | One |
| 2022/0299656 A1 | 9/2022 | Cui et al. |
| 2022/0383741 A1 | 12/2022 | Sanchez |
| 2023/0053785 A1 | 2/2023 | Carvalho et al. |
| 2023/0057509 A1 | 2/2023 | Emmons et al. |
| 2023/0085938 A1 | 3/2023 | He et al. |
| 2023/0110027 A1 | 4/2023 | Bajpayee et al. |
| 2023/0326215 A1 | 10/2023 | Yu et al. |
| 2024/0160194 A1 | 5/2024 | Bakhshmand et al. |
| 2024/0353231 A1 | 10/2024 | Burlina et al. |

FOREIGN PATENT DOCUMENTS

| | | |
|---|---|---|
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599537 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111307162 B | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |

(56) References Cited

FOREIGN PATENT DOCUMENTS

| | | | |
|---|---|---|---|
| CN | 111461053 A | 7/2020 |
| CN | 111461110 A | 7/2020 |
| CN | 110225341 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A1 | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 20 2017 102 235 U1 | 5/2017 |
| DE | 20 2017 102 238 U1 | 5/2017 |
| DE | 10 2017 116 017 A1 | 1/2019 |
| DE | 10 2018 130 821 A1 | 6/2020 |
| DE | 10 2019 008 316 A1 | 8/2020 |
| EP | 1 215 626 B1 | 9/2008 |
| EP | 2 228 666 B1 | 9/2012 |
| EP | 2 420 408 B1 | 5/2013 |
| EP | 2 723 069 A1 | 4/2014 |
| EP | 2 741 253 A1 | 6/2014 |
| EP | 3 115 772 A1 | 1/2017 |
| EP | 2 618 559 B1 | 8/2017 |
| EP | 3 285 485 A1 | 2/2018 |
| EP | 2 863 633 B1 | 2/2019 |
| EP | 3 113 080 B1 | 5/2019 |
| EP | 3 525 132 A1 | 8/2019 |
| EP | 3 531 689 A1 | 8/2019 |
| EP | 3 537 340 A1 | 9/2019 |
| EP | 3 543 917 A1 | 9/2019 |
| EP | 3 608 840 A1 | 2/2020 |
| EP | 3 657 387 A1 | 5/2020 |
| EP | 2 396 750 B1 | 6/2020 |
| EP | 3 664 020 A1 | 6/2020 |
| EP | 3 690 712 A1 | 8/2020 |
| EP | 3 690 730 A2 | 8/2020 |
| EP | 3 690 742 A1 | 8/2020 |
| EP | 3 722 992 A1 | 10/2020 |
| EP | 3 739 486 A1 | 11/2020 |
| EP | 3 501 897 B1 | 12/2020 |
| EP | 3 751 455 A2 | 12/2020 |
| EP | 3 783 527 A1 | 2/2021 |
| GB | 2 402 572 B | 8/2005 |
| GB | 2 548 087 A | 9/2017 |
| GB | 2 577 485 A | 4/2020 |
| GB | 2 517 270 B | 6/2020 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2015-004922 A | 1/2015 |
| JP | 5863536 B2 | 2/2016 |
| JP | 6044134 B2 | 12/2016 |
| JP | 2019-101535 A | 6/2019 |
| JP | 6525707 B2 | 6/2019 |
| JP | 2020-101927 A | 7/2020 |
| JP | 2020-173744 A | 10/2020 |
| KR | 100326702 B1 | 3/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 9/2019 |
| KR | 102043143 B1 | 11/2019 |
| KR | 102095335 B1 | 3/2020 |
| KR | 102097120 B1 | 4/2020 |
| KR | 10-2020-0085490 A | 7/2020 |
| KR | 10-2020-0142266 A | 12/2020 |
| KR | 102189262 B1 | 12/2020 |
| TW | 200630819 A | 9/2006 |
| TW | 1294089 B | 3/2008 |
| TW | 1306207 B | 2/2009 |
| WO | WO-02/052835 A2 | 7/2002 |
| WO | WO-2016/032398 A2 | 3/2016 |
| WO | WO-2016/048108 A1 | 3/2016 |
| WO | WO-2016/207875 A1 | 12/2016 |
| WO | WO-2017/158622 A2 | 9/2017 |
| WO | WO-2019/005547 A1 | 1/2019 |
| WO | WO-2019/067695 A1 | 4/2019 |
| WO | WO-2019/089339 A1 | 5/2019 |
| WO | WO-2019/092456 A1 | 5/2019 |
| WO | WO-2019/099622 A1 | 5/2019 |
| WO | WO-2019/122952 A1 | 6/2019 |
| WO | WO-2019/125191 A1 | 6/2019 |
| WO | WO-2019/126755 A1 | 6/2019 |
| WO | WO-2019/144575 A1 | 8/2019 |
| WO | WO-2019/182782 A1 | 9/2019 |
| WO | WO-2019/191578 A1 | 10/2019 |
| WO | WO-2019/216938 A1 | 11/2019 |
| WO | WO-2019/220436 A2 | 11/2019 |
| WO | WO-2020/006154 A2 | 1/2020 |
| WO | WO-2020/012756 A1 | 1/2020 |
| WO | WO-2020/025696 A1 | 2/2020 |
| WO | WO-2020/034663 A1 | 2/2020 |
| WO | WO-2020/056157 A1 | 3/2020 |
| WO | WO-2020/076356 A1 | 4/2020 |
| WO | WO-2020/097221 A1 | 5/2020 |
| WO | WO-2020/101246 A1 | 5/2020 |
| WO | WO-2020/120050 A1 | 6/2020 |
| WO | WO-2020/121973 A1 | 6/2020 |
| WO | WO-2020/131140 A1 | 6/2020 |
| WO | WO-2020/139181 A1 | 7/2020 |
| WO | WO-2020/139355 A1 | 7/2020 |
| WO | WO-2020/139357 A1 | 7/2020 |
| WO | WO-2020/142193 A1 | 7/2020 |
| WO | WO-2020/146445 A1 | 7/2020 |
| WO | WO-2020/151329 A1 | 7/2020 |
| WO | WO-2020/157761 A1 | 8/2020 |
| WO | WO-2020/163455 A1 | 8/2020 |
| WO | WO-2020/167667 A1 | 8/2020 |
| WO | WO-2020/174262 A1 | 9/2020 |
| WO | WO-2020/177583 A1 | 9/2020 |
| WO | WO-2020/185233 A1 | 9/2020 |
| WO | WO-2020/185234 A1 | 9/2020 |
| WO | WO-2020/195658 A1 | 10/2020 |
| WO | WO-2020/198189 A1 | 10/2020 |
| WO | WO-2020/198779 A1 | 10/2020 |
| WO | WO-2020/205597 A1 | 10/2020 |
| WO | WO-2020/221200 A1 | 11/2020 |
| WO | WO-2020/240284 A2 | 12/2020 |
| WO | WO-2020/245654 A1 | 12/2020 |

(56) References Cited

FOREIGN PATENT DOCUMENTS

| WO | WO-2020/260020 A1 | 12/2020 |
| WO | WO-2020/264010 A1 | 12/2020 |

OTHER PUBLICATIONS

International Preliminary Report on Patentability on PCT/US2022/040793 Dtd Feb. 29, 2024 (10 pages).
International Preliminary Report on Patentability on PCT/US2022/040906 Dtd Feb. 29, 2024 (9 pages).
International Search Report and Written Opinion on PCT Appl. No. PCT/US2022/040784 dated Dec. 7, 2022 (15 pages).
International Search Report and Written Opinion on PCT Appl. No. PCT/US2022/040793 dated Nov. 30, 2022 (17 pages).
International Search Report and Written Opinion on PCT Appl. No. PCT/US2022/040906 dated Nov. 18, 2022 (16 pages).
ISR and WO on PCT patent application No. PCT/US2022/040793 dated Oct. 25, 2023 (30 pages).
Chen et al., "Simultaneous End-to-End Vehicle and License Plate Detection With Multi-Branch Attention Neural Network," 2020, IEEE Transactions on Intelligent Transportation Systems, vol. 21, Issue 9, 10 Pages.
Hu et al., "SINet: A Scale-Insensitive Convolutional Neural Network for Fast Vehicle Detection," 2019, IEEE Transactions on Intelligent Transportation Systems, vol. 20, Issue 3, 18 Pages.
Kumar et al., "OmniDet: Surround View Cameras Based Multi-Task Visual Perception Network for Autonomous Driving," 2021, IEEE, Robotics and Automation Letters, vol. 6, Issue 2 (8 Pages).
Li et al., "One-Stage Multi-Sensor Data Fusion Convolutional Neural Network for 3D Object Detection," 2019, 18 Pages.
Duzceker, et al., "DeepVideoMVS: Multi-View Stereo on Video with Recurrent Spatio-Temporal Fusion," arXiv:2012.02177, 16 pages (2021).

\* cited by examiner

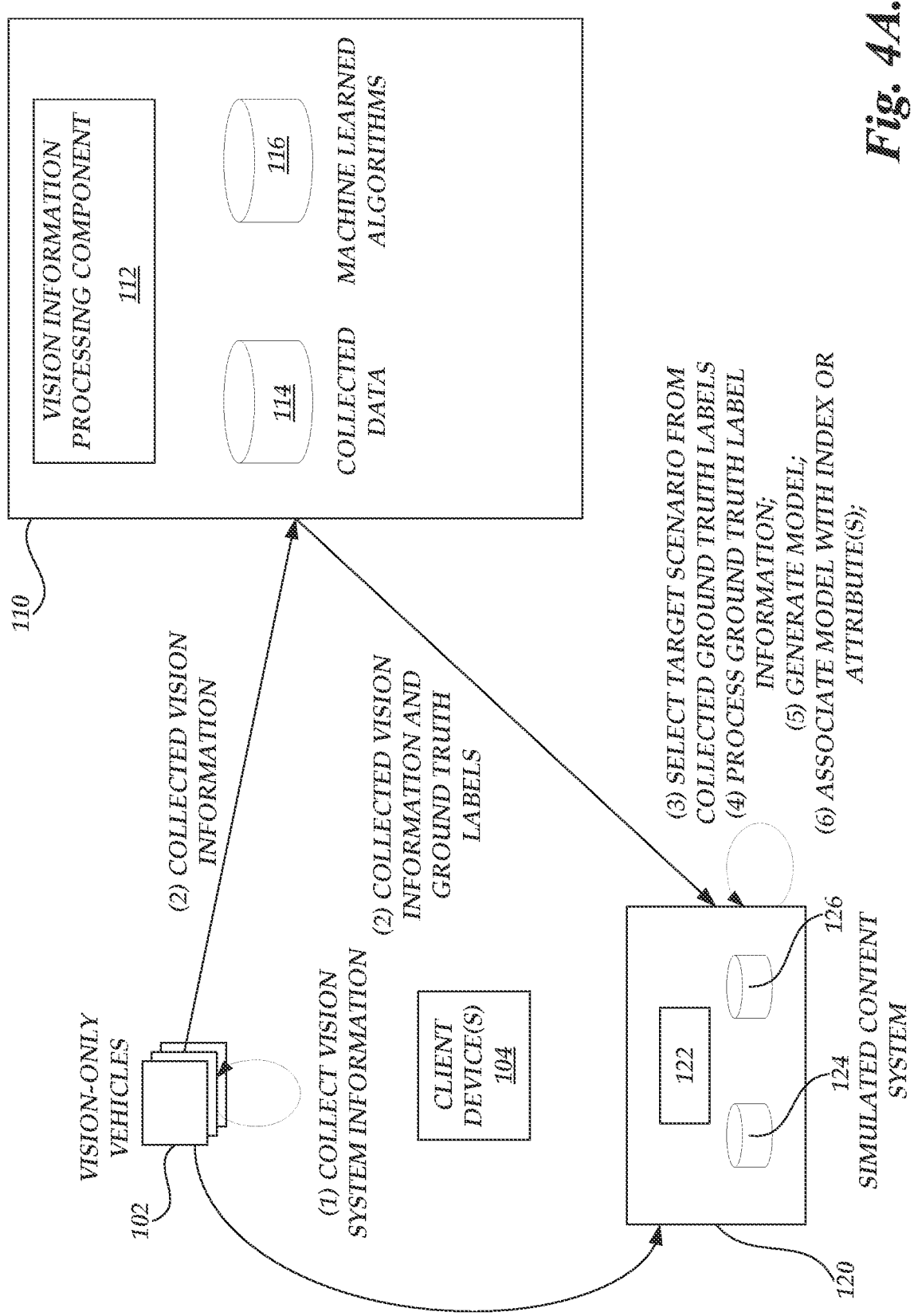

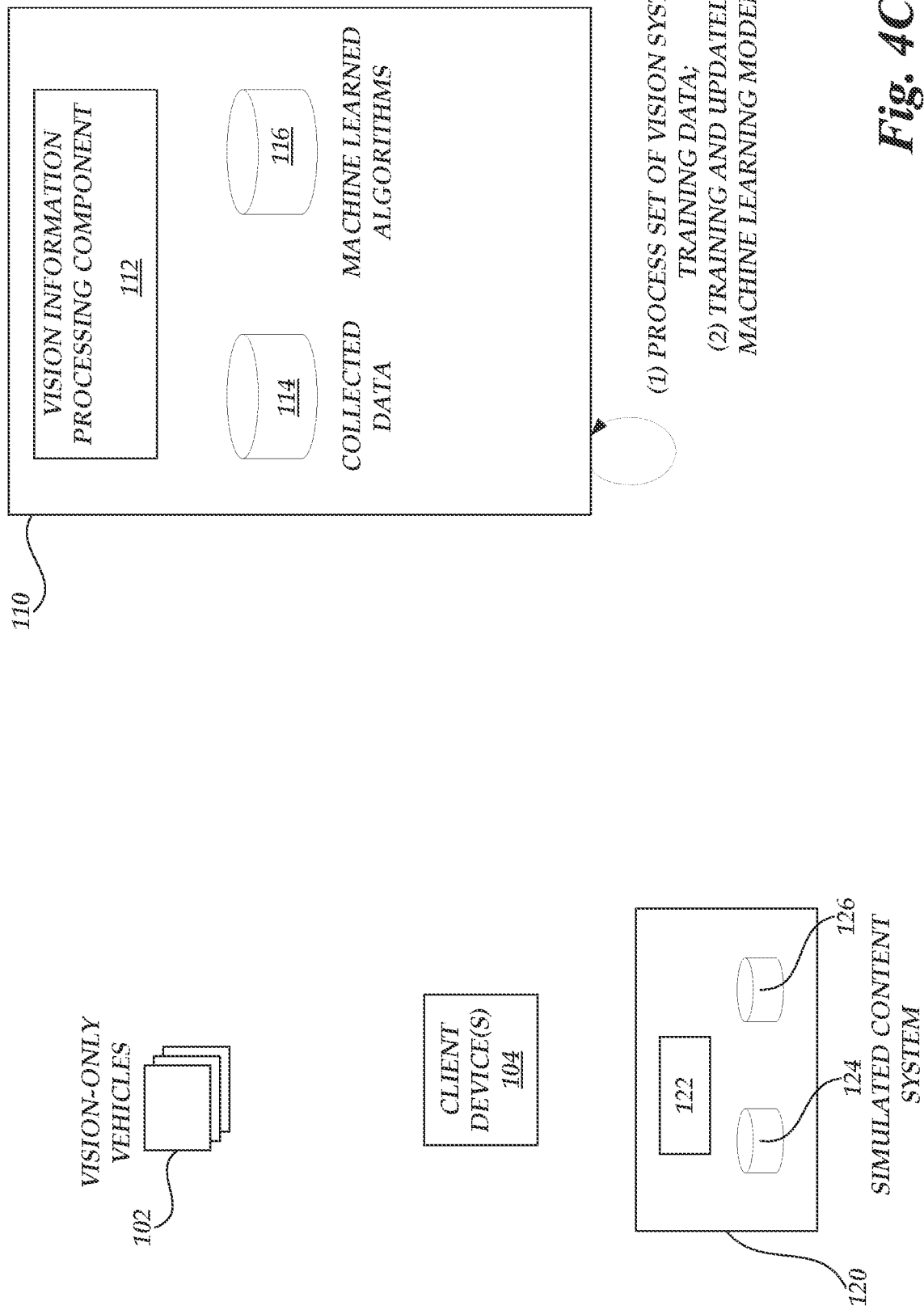

VISION-BASED SYSTEM TRAINING WITH SIMULATED CONTENT

CROSS-REFERENCE TO RELATED APPLICATIONS

This application is a U.S. National Phase Application under 35 U.S.C. § 371 of International Application No. PCT/US2022/040793, filed on Aug. 18, 2022, which claims priority to U.S. Provisional Application No. 63/260,439 entitled ENHANCED SYSTEMS AND METHODS FOR AUTONOMOUS VEHICLE OPERATION AND TRAINING and filed on Aug. 19, 2021, and U.S. Provisional Application No. 63/287,936 entitled ENHANCED SYSTEMS AND METHODS FOR AUTONOMOUS VEHICLE OPERATION AND TRAINING and filed on Dec. 9, 2021. U.S. Provisional Application Nos. 63/260,439 and 63/287,936, as well as PCT Application No. PCT/US2022/040793 are each incorporated by reference in their entirety.

BACKGROUND

Generally described, computing devices and communication networks can be utilized to exchange data and/or information. In a common application, a computing device can request content from another computing device via the communication network. For example, a computing device can collect various data and utilize a software application to exchange content with a server computing device via the network (e.g., the Internet).

Generally described, a variety of vehicles, such as electric vehicles, combustion engine vehicles, hybrid vehicles, etc., can be configured with various sensors and components to facilitate operation of the vehicle or management of one or more systems include in the vehicle. In certain scenarios, a vehicle owner or vehicle user may wish to utilize sensor-based systems to facilitate in the operation of the vehicle. For example, vehicles can often include hardware and software functionality that facilitates location services or can access computing devices that provide location services. In another example, vehicles can also include navigation systems or access navigation components that can generate information related to navigational or directional information provided to vehicle occupants and users. In still further examples, vehicles can include vision systems to facilitate navigational and location services, safety services or other operational services/components.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

FIGS. 4A-4C are block diagrams of the illustrative environment of FIG. 1 illustrated the generation of simulated model content and the subsequent generation of a set of vision system training data for machine learning algorithms based on simulate model content;

DETAILED DESCRIPTION

Figure 1:
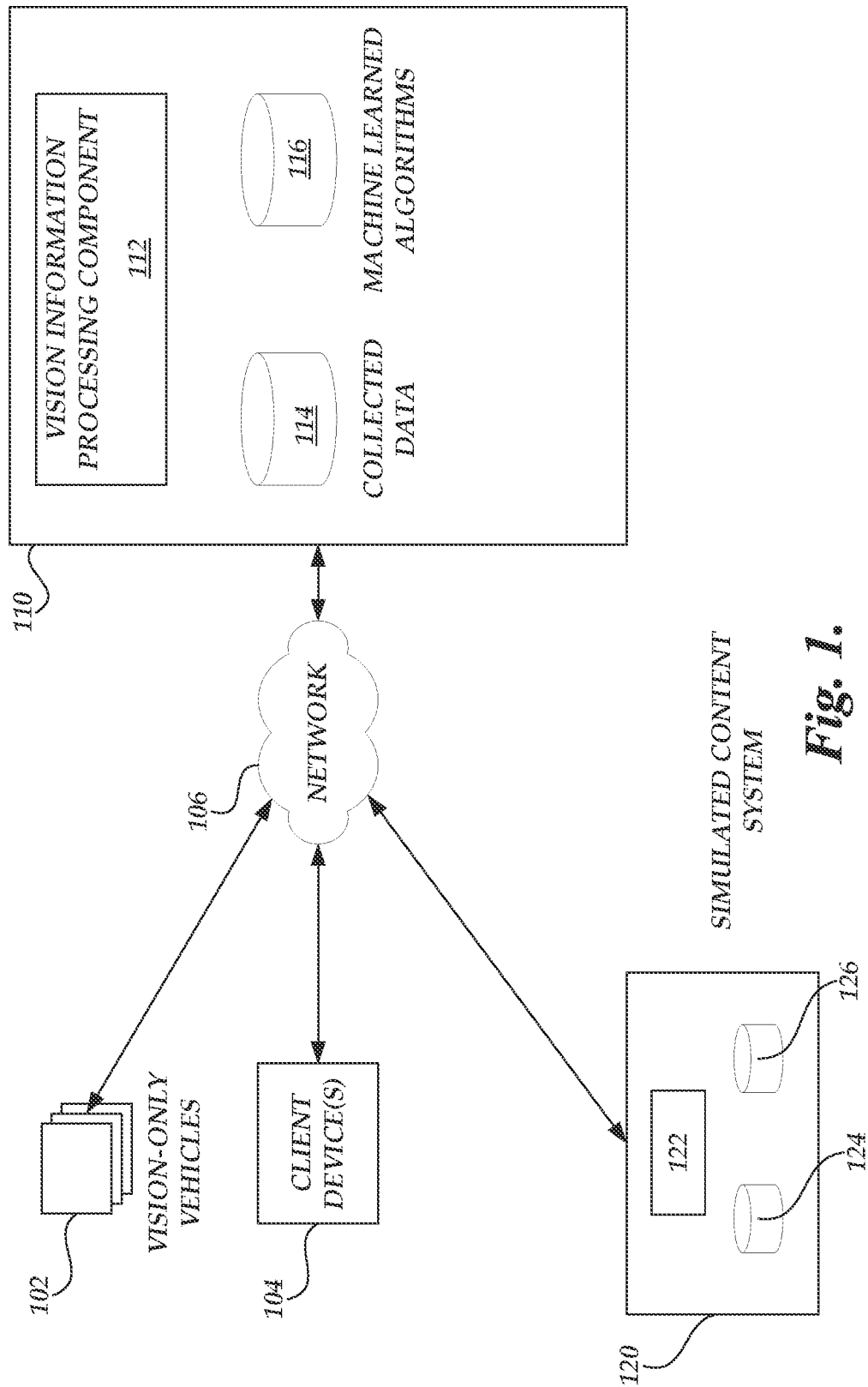
FIG. 1 depicts a block diagram of an illustrative environment for generating simulated content models and training set data for vision systems in vehicles in accordance with one or more aspects of the present application.

Generally described, one or more aspects of the present disclosure relate to the configuration and implementation of vision systems in vehicles. By way of illustrative example, aspects of the present application relate to the configuration and training of machine learned algorithms used in vehicles relying solely on vision systems for various operational functions. Illustratively, the vision-only systems are in contrast to vehicles that may combine vision-based systems with one or more additional sensor systems, such as radar-based systems, LIDAR-based systems, SONAR-systems, and the like.

Vision-only systems can be configured with machine learned algorithms that can process inputs solely from vision systems that can include a plurality of cameras mounting on the vehicle. The machine learned algorithm can generate outputs identifying objects and specifying characteristics/attributes of the identified objects, such as position, velocity, acceleration measured relative to the vehicle. The outputs from the machine learned algorithms can be then utilized for further processing, such as for navigational systems, locational systems, safety systems and the like.

In accordance with aspects of the present application, a network service can configure the machine learned algorithm in accordance with a supervised learning model in which a machine learning algorithm is trained with labeled data including identified objects and specified characteristics/attributes, such as position, velocity, acceleration, and the like. A first portion the training data set corresponds to data collected from target vehicles that include vision systems, such as the vision systems included in the vision-only system in the vehicles. Additionally, a second portion of the training data corresponds to additional information obtained from other systems, namely, a simulated content system that can generate video images and associated attribute information (e.g., ground truth label data based on the simulated content). Illustratively, the simulated content system can process at least the ground truth label data (or a portion thereof) from the captured vision system data to generate simulated content with associated ground truth labeling information for use in training sets for the supervised learning models.

Illustratively, a network service can receive a set of inputs (e.g., a first data set) from a target vehicle including ground truth label data associated with captured vision system data. In one embodiment, the first data set does not have to include the captured video data, but can include resulting ground truth label associated with the captured video data. The network service then processes at least the ground truth label data associated with the captured vision system data to determine content model attributes that will be used to generate a set of simulated content (e.g., a second data set). For example, the content model attributes may be limited to a selection from the set of received ground truth information associated with specific types of ground truth labels, such as road edges. In another example, the content model attributes can include the ground truth labels, such as road edges, and include additional dependent ground truth labels, such as lane lines, center lanes, etc.

Illustratively, the generated simulated content data sets allows the supplementing of the previously collected ground truth data/vision data with additional information or attribute/characteristics that may not have been otherwise available from processing the vision data. In one aspect, once the selected subset of ground truth labels have been selected, the simulated content service can select from generic templates to compliment/supplement the ground truth labels. For example, the simulated content service can select from templates of ground truth labels, such as cityscapes (e.g., a generic city environment or rural environment), environmental objects (e.g., different types of stationary objects), etc. Additionally, the simulated content can include modified or altered ground truth label information. The resulting processed content attributes can then form the basis for subsequent generation of training data.

Illustratively, the simulated content service can receive requests or determine to generate a set of training data for an updated training set. The simulated content service can identify and utilize one of the generated content models as the basis for creating multiple variations based on the selected content model. The resulting simulated content includes the ground truth labels data including the ground truth labels based on the base content model and the variations depicted in each created piece of content. Thereafter, the network service generates an updated machine learned algorithm based on training on the combined data set. The trained machine learned algorithm may be transmitted to vision-only based vehicles.

Traditionally, vehicles are associated with physical sensors that can be used to provide inputs to control components. For many navigational, location and safety system, the physical sensors include detection-based systems, such as radar systems, LIDAR systems, etc. that are able to detect objects and characterize attributes of the detected objects. In some applications, detection systems can increase the cost of manufacture and maintenance. Additionally, in some environmental scenarios, such as rain, fog, snow, the detection-based systems may not be well suited for detection or can increase detection errors.

To address at least a portion of the above deficiencies, aspects of the present application correspond to utilization of a set of inputs from vision systems so that simulation systems can generate additional content for training machine learned algorithms. For example, the updated trained machine learned algorithms can be distributed to vehicles with vision system-only based processing. Aspects of the present application correspond to utilization of a set of inputs from sensors or sensing systems and simulation systems as the basis for a simulation system to create updated training sets for use in machine learning algorithms. The set of inputs includes a first set of data corresponding to vision system from a plurality of cameras configured in a vehicle. The first set of data can include visual images and data labels (e.g., ground truth labels). The ground truth labels can include various detected objects, such as lane edges, center lanes, static objects, and dynamic objects. In some embodiments, the first set of data can include the ground truth label data base don the captured visual image data without need to provide the captured video image data. The ground truth label information may be provided by additional, independent services that can process the captured visual data provided by vehicle vision systems to generate ground truth label data.

Illustratively, a network service can receive the process the set of inputs (e.g., the associated ground truth label data) collected from one or more target vehicles. The network service can then process the vision-based data to form the content model attributes that will be used as the basis or core portion of the simulated content. For example, the content model attributes can include/select at least an initial portion (e.g., a first portion) of the provided ground truth label information corresponding the road edges. The network service can then also include/select some portion of the additional ground truth label information (e.g., a second portion) that can be included in the simulated content. Such second portion can include center lane, lane lines, stationary objects, etc. The network service (e.g., a simulated content service) can also supplement or replace the obtained ground truth information based on templates or other pre-configured ground truth labels to be included. For example, a filtered set of ground truth label data corresponding to a suburban setting may be supplemented with a template of ground truth labels for objects characterized as associated with such suburban settings, such as trees, houses, parked vehicles, etc.

Upon request or other triggering event, the network service can select one or content models to use to generate a set of training data based on variations of the content model(s). For example, the above content model related to the suburban setting can be used to generate simulated content and associated ground truth labels based on variations associated with types of stationary objects, dynamic objects (e.g., other vehicles), weather conditions, obstructions, various signage, and the like. Illustratively, the generated data sets allows the supplementing of the previously collected vision data with additional information or attribute/characteristics that may not have been otherwise available from processing the vision data. The network service can then process the full set of vision data and generated content with data labels. Thereafter, the network service generates an updated machine learned algorithm based on training on the combined data set. The trained machine learned algorithm may be transmitted to vision-only based vehicles.

Although the various aspects will be described in accordance with illustrative embodiments and combination of features, one skilled in the relevant art will appreciate that the examples and combination of features are illustrative in nature and should not be construed as limiting. More specifically, aspects of the present application may be applicable with various types of vehicles including vehicles with different of propulsion systems, such as combination engines, hybrid engines, electric engines, and the like. Still further, aspects of the present application may be applicable with various types of vehicles that can incorporate different types of sensors, sensing systems, navigation systems, or location systems. Accordingly, the illustrative examples should not be construed as limiting. Similarly, aspects of the present application may be combined with or implemented with other types of components that may facilitate operation of the vehicle, including autonomous driving applications, driver convenience applications and the like.

FIG. 1 depicts a block diagram of an illustrative environment 100 for generating simulated content models and training set data for vision systems in vehicles in accordance with one or more aspects of the present application. The system 100 can comprise a network, the network connecting a set of vehicles 102, a network service 110, and a simulated content system 120. Illustratively, the various aspects associated with the network service 110 and simulated content system 120 can be implemented as one or more components that are associated with one or more functions or services. The components may correspond to software modules implemented or executed by one or more external computing devices, which may be separate stand-alone external computing devices. Accordingly, the components of the network service 110 and the simulated content system 120 should be considered as a logical representation of the service, not requiring any specific implementation on one or more external computing devices.

Network 106, as depicted in FIG. 1, connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services. In some embodiments, the network may be a content delivery network.

Illustratively, the set of vehicles 102 correspond to one or more vehicles configured with vision-only based system for identifying objects and characterizing one or more attributes of the identified objects. The set of vehicles 102 are configured with machine learned algorithms, such as machine learned algorithms implemented a supervised learning model, that are configured to utilize solely vision systems inputs to identify objects and characterize attributes of the identified objects, such as position, velocity and acceleration attributes. The set of vehicles 102 may be configured without any additional detection systems, such as radar detection systems, LIDAR detection systems, and the like.

Illustratively, the network service 110 can include a plurality of network-based services that can provide functionality responsive to configurations/requests for machine learned algorithms for vision-only based systems as applied to aspects of the present application. As illustrated in FIG. 1, the network-based services 110 can include a vision information processing component 112 that can obtain data sets from the vehicles 102 and the simulated content systems 120, process sets of data to form training materials for machine learning algorithm and generate machine learned algorithms for vision-only based vehicles 102. The network-based service can include a plurality of data stores for maintaining various information associated with aspects of the present application, including a vehicle data store 114 and machine learned algorithm data store 116. The data stores in FIG. 1 are logical in nature and can be implemented in the network service 110 in a variety of manners.

Similar to network service 110, the simulated content service 120 can include a plurality of network-based services that can provide functionality related to providing visual frames of data and associated data labels for machine learning applications as applied to aspects of the present application. As illustrated in FIG. 1, the network-based services 120 can include a scenario generation component 122 that can create various simulated content scenarios according to a set of defined attributes/variables. The simulated content service 120 can include a plurality of data stores for maintaining various information associated with aspects of the present application, including a scenario clip data store 124 and ground truth attribute data store 126. The data stores in FIG. 1 are logical in nature and can be implemented in the simulated content service in a variety of manners.

Figure 2A:
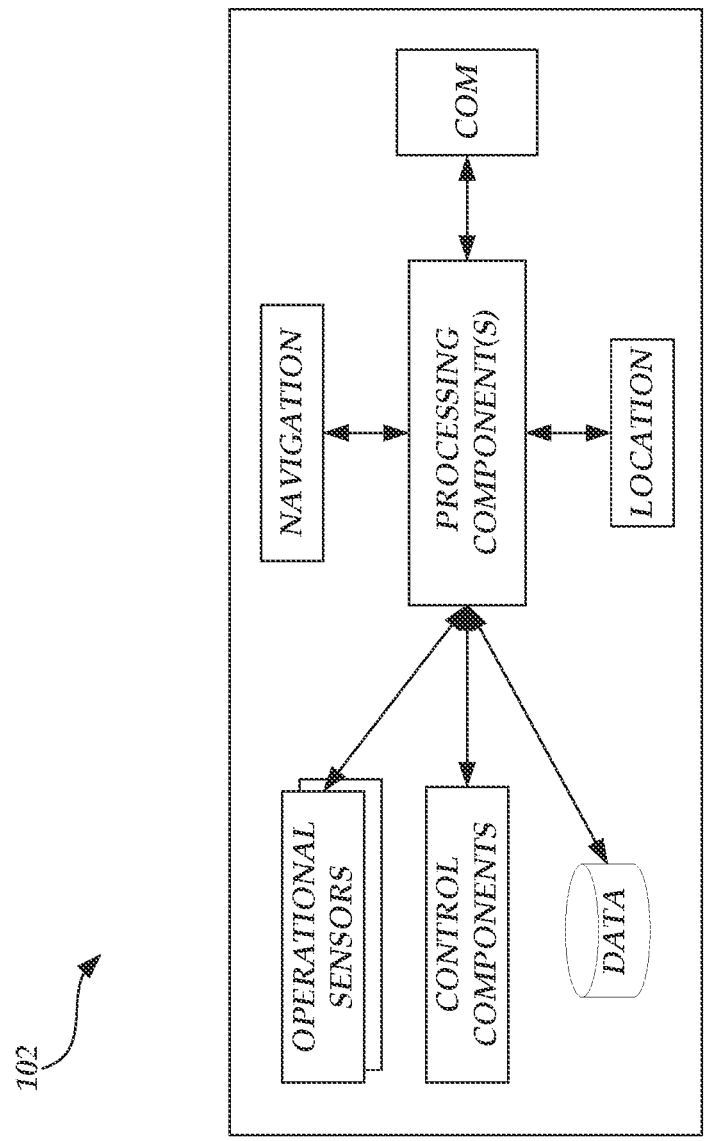
FIG. 2A illustrates an environment that corresponds to vehicles in accordance with one or more aspects of the present application.

For purposes of illustration, FIG. 2A illustrates an environment that corresponds to vehicles 102 in accordance with one or more aspects of the present application. The environment includes a collection of local sensor inputs that can provide inputs for the operation of the vehicle or collection of information as described herein. The collection of local sensors can include one or more sensor or sensor-based systems included with a vehicle or otherwise accessible by a vehicle during operation. The local sensors or sensor systems may be integrated into the vehicle. Alternatively, the local sensors or sensor systems may be provided by interfaces associated with a vehicle, such as physical connections, wireless connections, or a combination thereof.

In one aspect, the local sensors can include vision systems that provide inputs to the vehicle, such as detection of objects, attributes of detected objects (e.g., position, velocity, acceleration), presence of environment conditions (e.g., snow, rain, ice, fog, smoke, etc.), and the like. An illustrative collection of cameras mounted on a vehicle to form a vision system will be described with regard to FIG. 2B. As previously described, vehicles 102 will rely on such vision systems for defined vehicle operational functions without assistance from or in place of other traditional detection systems.

In yet another aspect, the local sensors can include one or more positioning systems that can obtain reference information from external sources that allow for various levels of accuracy in determining positioning information for a vehicle. For example, the positioning systems can include various hardware and software components for processing information from GPS sources, Wireless Local Area Networks (WLAN) access point information sources, Bluetooth information sources, radio-frequency identification (RFID) sources, and the like. In some embodiments, the positioning systems can obtain combinations of information from multiple sources. Illustratively, the positioning systems can obtain information from various input sources and determine positioning information for a vehicle, specifically elevation at a current location. In other embodiments, the positioning systems can also determine travel-related operational parameters, such as direction of travel, velocity, acceleration, and the like. The positioning system may be configured as part of a vehicle for multiple purposes including self-driving applications, enhanced driving or user-assisted navigation, and the like. Illustratively, the positioning systems can include processing components and data that facilitate the identification of various vehicle parameters or process information.

In still another aspect, the local sensors can include one or more navigations system for identifying navigation related information. Illustratively, the navigation systems can obtain positioning information from positioning systems and identify characteristics or information about the identified location, such as elevation, road grade, etc. The navigation systems can also identify suggested or intended lane location in a multi-lane road based on directions that are being provided or anticipated for a vehicle user. Similar to the location systems, the navigation system may be configured as part of a vehicle for multiple purposes including self-driving applications, enhanced driving or user-assisted navigation, and the like. The navigation systems may be combined or integrated with positioning systems. Illustratively, the positioning systems can include processing components and data that facilitate the identification of various vehicle parameters or process information.

The local resources further include one or more processing component(s) that may be hosted on the vehicle or a computing device accessible by a vehicle (e.g., a mobile computing device). The processing component(s) can illustratively access inputs from various local sensors or sensor systems and process the inputted data as described herein. For purposes of the present application, the processing component(s) will be described with regard to one or more functions related to illustrative aspects. For example, processing component(s) in vehicles 102 will collect and transmit the first data set corresponding to the collected vision information.

The environment can further include various additional sensor components or sensing systems operable to provide information regarding various operational parameters for use in accordance with one or more of the operational states. The environment can further include one or more control components for processing outputs, such as transmission of data through a communications output, generation of data in memory, transmission of outputs to other processing components, and the like.

Figure 2B:
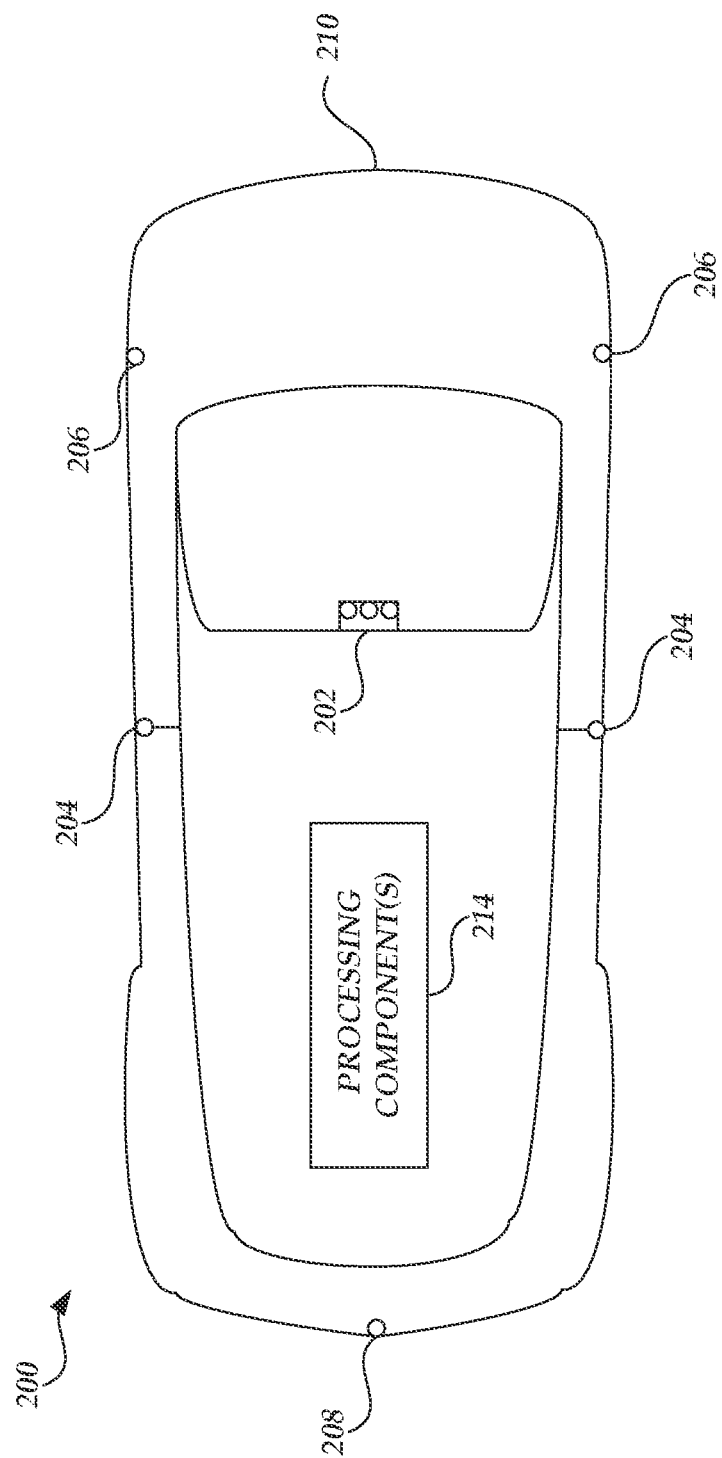
FIG. 2B an illustrative vision system for a vehicle in accordance with one or more aspects of the present application.

With reference now to FIG. 2B, an illustrative vision system 200 for a vehicle will be described. The vision system 200 includes a set of cameras that can capture image data during the operation of a vehicle. As described above, individual image information may be received at a particular frequency such that the illustrated images represent a particular time stamp of images. In some embodiments, the image information may represent high dynamic range (HDR) images. For example, different exposures may be combined to form the HDR images. As another example, the images from the image sensors may be pre-processed to convert them into HDR images (e.g., using a machine learning model).

As illustrated in FIG. 2B, the set of cameras can include a set of front facing cameras 202 that capture image data. The front facing cameras may be mounted in the windshield area of the vehicle to have a slightly higher elevation. As illustrated in FIG. 2B, the front facing cameras 202 can including multiple individual cameras configured to generate composite images. For example, the camera housing may include three image sensors which point forward. In this example, a first of the image sensors may have a wide-angled (e.g., fish-eye) lens. A second of the image sensors may have a normal or standard lens (e.g., 35 mm equivalent focal length, 50 mm equivalent, and so on). A third of the image sensors may have a zoom or narrow lens. In this way, three images of varying focal lengths may be obtained in the forward direction by the vehicle. The vision system 200 further includes a set of cameras 204 mounted on the door pillars of the vehicle. The vision system 200 can further include two cameras 206 mounted on the front bumper of the vehicle. Additionally, the vision system 200 can include a rearward facing camera 208 mounted on the rear bumper, trunk or license plate holder.

The set of cameras 202, 204, 206, and 208 may all provide captured images to one or more processing components 212, such as a dedicated controller/embedded system. For example, the processing component 212 may include one or more matrix processors which are configured to rapidly process information associated with machine learning models. The processing component 212 may be used, in some embodiments, to perform convolutions associated with forward passes through a convolutional neural network. For example, input data and weight data may be convolved. The processing component 212 may include a multitude of multiply-accumulate units which perform the convolutions. As an example, the matrix processor may use input and weight data which has been organized or formatted to facilitate larger convolution operations. Alternatively, the image data may be transmitted to a general-purpose processing component.

Illustratively, the individual cameras may operate, or be considered individually, as separate inputs of visual data for processing. In other embodiments, one or more subsets of camera data may be combined to form composite image data, such as the trio of front facing cameras 202. As further illustrated in FIG. 2B, in embodiments related to vehicles incorporating vision only systems, such as vehicles 102, no detection systems would be included at 210.

Figure 3A:
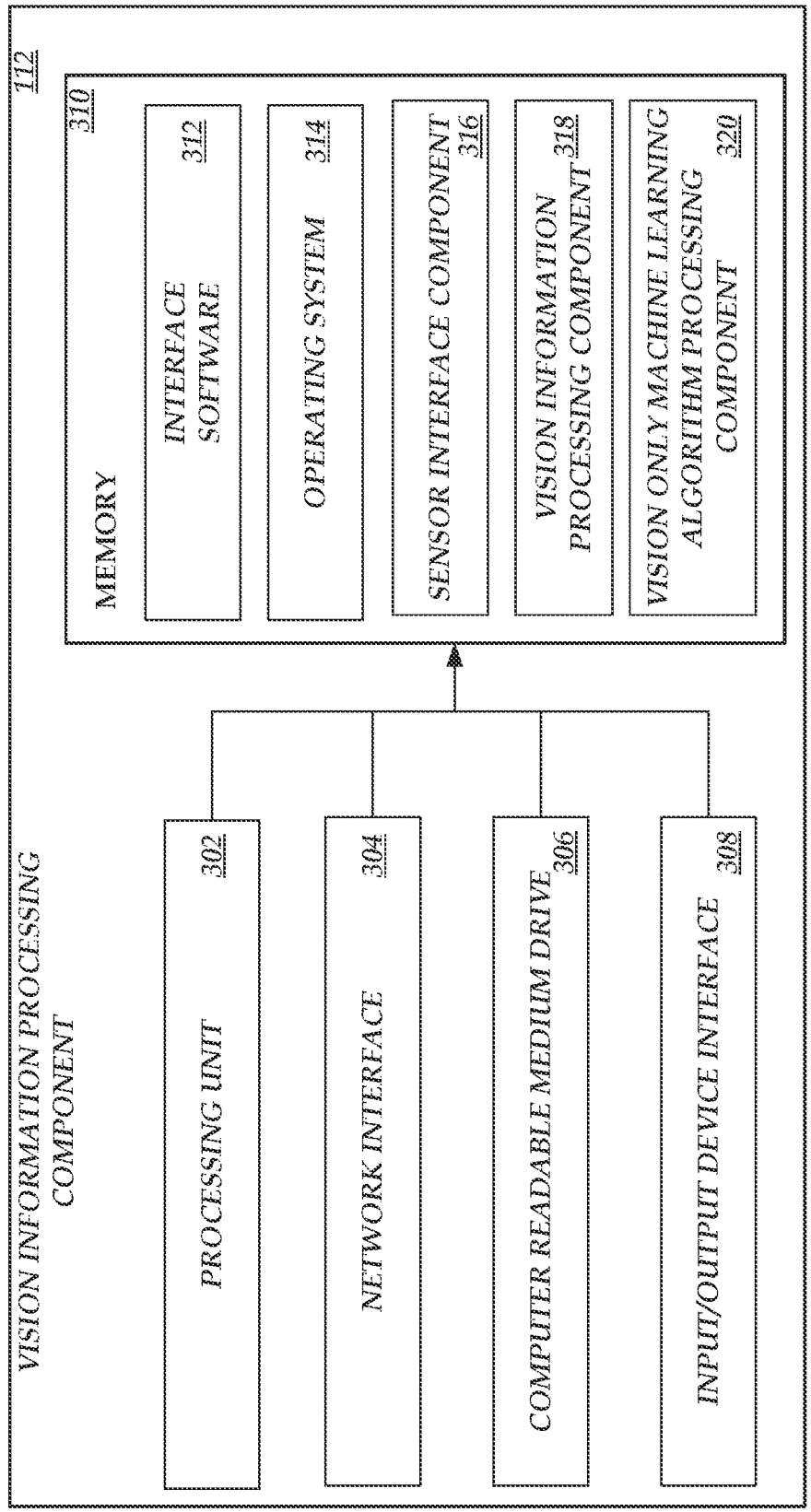
FIG. 3A depicts an illustrative architecture for implementing a vision information processing component in accordance with aspects of the present application.

With reference now to FIG. 3A, an illustrative architecture for implementing the vision information processing component 112 on one or more local resources or a network service will be described. The vision information processing component 112 may be part of components/systems that provide functionality associated with the machine learned algorithms for object recognition, navigation, locations services, and the like.

The architecture of FIG. 3A is illustrative in nature and should not be construed as requiring any specific hardware or software configuration for the vision information processing component 112. The general architecture of the vision information processing component 112 depicted in FIG. 3A includes an arrangement of computer hardware and software components that may be used to implement aspects of the present disclosure. As illustrated, the vision information processing component 112 includes a processing unit 302, a network interface 304, a computer readable medium drive 306, and an input/output device interface 308, all of which may communicate with one another by way of a communication bus. The components of the vision information processing component 112 may be physical hardware components or implemented in a virtualized environment.

The network interface 304 may provide connectivity to one or more networks or computing systems, such as the network of FIG. 1. The processing unit 302 may thus receive information and instructions from other computing systems or services via a network. The processing unit 302 may also communicate to and from memory 310 and further provide output information for an optional display (not shown) via the input/output device interface 308. In some embodiments, the vision information processing component 112 may include more (or fewer) components than those shown in FIG. 3A.

The memory 310 may include computer program instructions that the processing unit 302 executes in order to implement one or more embodiments. The memory 310 generally includes RAM, ROM, or other persistent or non-transitory memory. The memory 310 may store interface software 312 and an operating system 314 that provides computer program instructions for use by the processing unit 302 in the general administration and operation of the vision information processing component 112. The memory 310 may further include computer program instructions and other information for implementing aspects of the present disclosure. For example, in one embodiment, the memory 310 includes a sensor interface component 316 that obtains information (e.g., captured video information) from vehicles, such as vehicles 102, data stores, other services, and the like.

The memory 310 further includes a vision information processing component 318 for obtaining and processing the captured vision system information and generating additional or alternative ground truth label information for the captured vision information in accordance with various operational states of the vehicle as described herein. The memory 310 can further include a vision-based machine learning algorithm processing component 320 for generating or training machine learned algorithms for use in vision-only based vehicles 102. Illustratively, in one embodiment, the vision-based machine learning algorithm processing component 320 can utilize sets of simulated content as training data as described herein. Although illustrated as components combined within the vision information processing component 112, one skilled in the relevant art will understand that one or more of the components in memory 310 may be implemented in individualized computing environments, including both physical and virtualized computing environments.

Figure 3B:
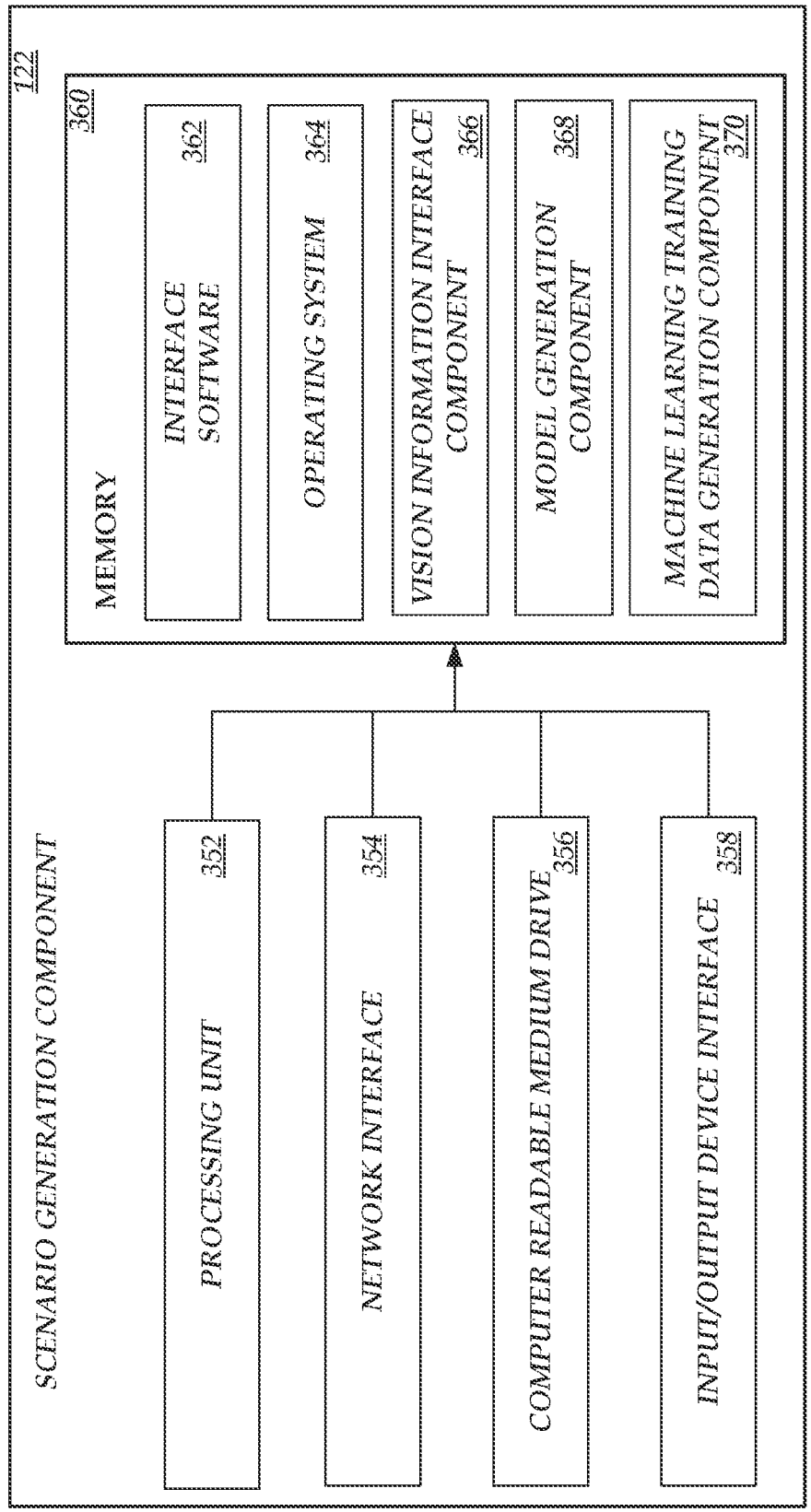
FIG. 3B depicts an illustrative architecture for implementing a simulated content service in accordance with aspects of the present application.

With reference now to FIG. 3B, an illustrative architecture for implementing a simulated content service 122 in accordance with aspects of the present application will be described. The simulated content service 122 may be part of components/systems that provide data, such as training data, associated with generating machine learned algorithms for object recognition, navigation, locations services, and the like.

The architecture of FIG. 3B is illustrative in nature and should not be construed as requiring any specific hardware or software configuration for the simulated content service 122. The general architecture of the simulated content service 122 depicted in FIG. 3B includes an arrangement of computer hardware and software components that may be used to implement aspects of the present disclosure. As illustrated, the v simulated content service 122 includes a processing unit 352, a network interface 354, a computer readable medium drive 356, and an input/output device interface 358, all of which may communicate with one another by way of a communication bus. The components of the simulated content service 122 may be physical hardware components or implemented in a virtualized environment.

The network interface 354 may provide connectivity to one or more networks or computing systems, such as the network of FIG. 1. The processing unit 352 may thus receive information and instructions from other computing systems or services via a network. The processing unit 352 may also communicate to and from memory 360 and further provide output information for an optional display (not shown) via the input/output device interface 358. In some embodiments, the simulated content service 122 may include more (or fewer) components than those shown in FIG. 3B.

The memory 360 may include computer program instructions that the processing unit 352 executes in order to implement one or more embodiments. The memory 360 generally includes RAM, ROM, or other persistent or non-transitory memory. The memory 360 may store interface software 362 and an operating system 364 that provides computer program instructions for use by the processing unit 352 in the general administration and operation of the simulated content service 122.

The memory 360 may further include computer program instructions and other information for implementing aspects of the present disclosure. For example, in one embodiment, the memory 360 includes a vision information interface component 366 that obtains vision system information from vehicles, such as vehicles 102, data stores, other services, and the like. The memory 360 further includes a model training component 368 for obtaining and processing the received vision system data or data labels (e.g., ground truth label data) and processing the vision system data in simulated content attribute data as described herein. The memory 360 can further include a vision-based machine learning algorithm processing component 370 for generating training data for machine learned algorithms for use in vision-only based vehicles 102.

Although illustrated as components combined within the simulated content service 122, one skilled in the relevant art will understand that one or more of the components in memory 310 may be implemented in individualized computing environments, including both physical and virtualized computing environments.

Figure 4B:
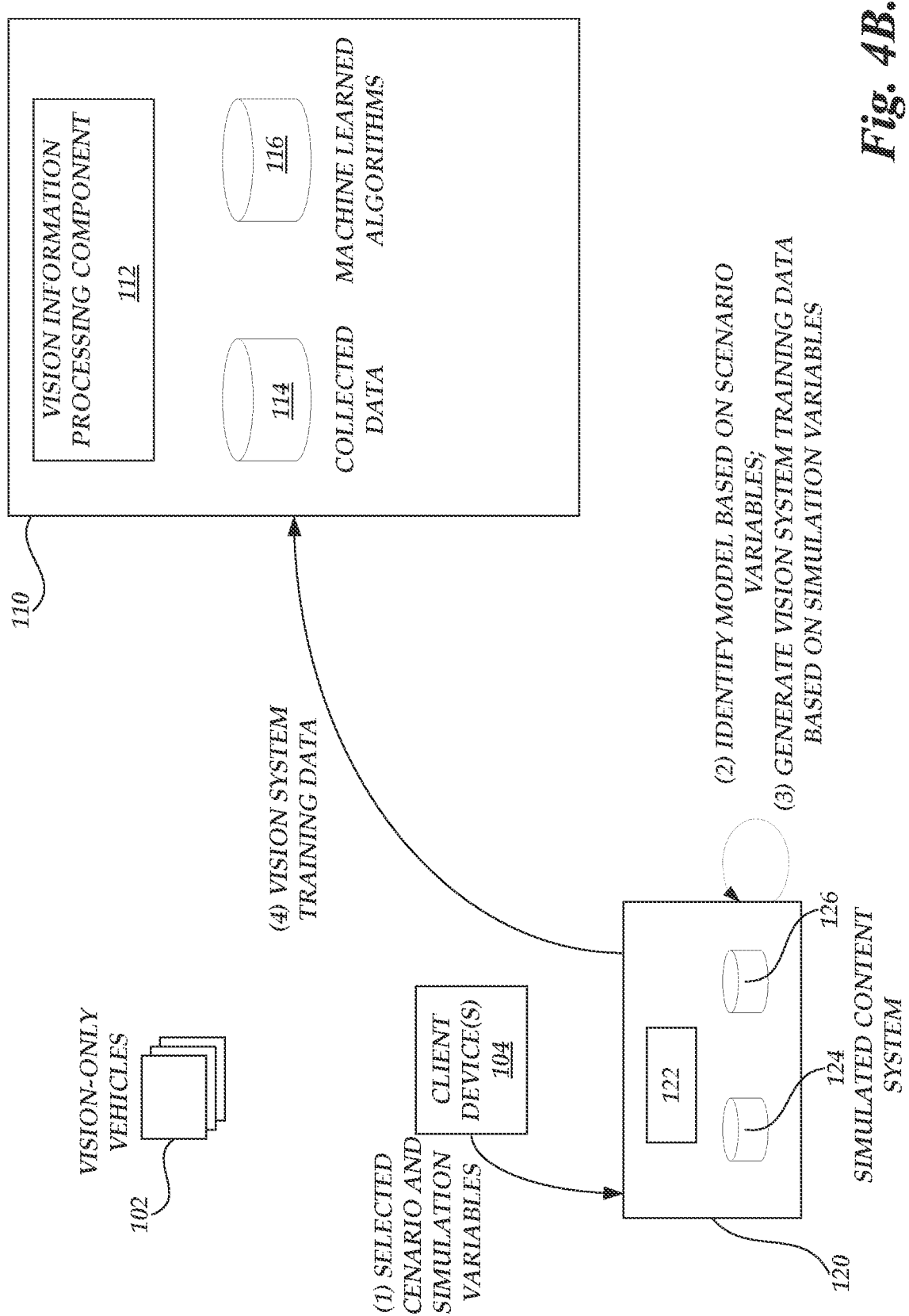

Turning now to FIGS. 4A-4C, illustrative interactions for the components of the environment to process vision system data and generate simulated content system data to update training models for machine learning algorithms will be described. At (1), one or more vehicles 102 can collect and transmit a set of inputs (e.g., the first data set). The first set of data illustratively corresponds to the video image data and any associated metadata or other attributes collected by the vision system 200 of the vehicle 102.

Illustratively, the vehicles 102 may be configured to collect vision system data and transmit the collected data. Illustratively, the vehicles 102 may include processing capabilities in vision systems to generate, at least in part, ground truth label information for the captured vision system information. In other embodiments, the vehicles 102 may transmit captured vision system information (with or without any ground truth labels) to another service, such as in the network 110. The additional services can then add (manually or automatically) ground truth label information. For example, the collected vision system data may be transmitted based on periodic timeframes or various collection/transmission criteria. Still further, in some embodiments, the vehicles 102 may also be configured to identify specific scenarios or locations, such as via geographic coordinates or other identifiers, that will result in the collection and transmission of the collected data. As shown in FIG. 4A, at (2), the collected vision system data may be transmitted to the simulated content service 122 directly from the vehicle 102 or indirectly through the network service 110.

At (3), the simulated content service 122 receives and processes the collected vision system data and ground truth labels from the vehicles 102. Illustratively, the simulated content service 122 can process the vision-based data, such as to complete lost frames of video data, update version information, error correction, and the like. Additionally, at (3), in some embodiments, the simulated content service 122 can further process the collected vision system data to identify ground truth labels for the captured video data. In still other embodiments, the simulated content service 122 can request or otherwise obtain missing or erroneous ground truth label information from additional sources. Illustratively, the ground truth labels can correspond to any one of a variety of detectable objects that may be depicted in the video data. In one embodiment, the ground truth label data can include information identifying road edges, which may have a higher priority or significance in the generation of the simulated content (as described in one illustrative embodiment). Additionally, the ground truth label data can include information dependent on the identified road edge, such as lane lines, lane centers, etc. and one or more stationary objects (e.g., road signs, markers, etc.). Still further, in some embodiments, the ground truth label data can include dynamic object data related to one or more identified objects, such as vehicles, dynamic obstructions, environmental objects, and the like. In some embodiments, the additional processing of the received vision data and ground truth label information as described at (3) may not be required.

At (4), the simulated content service 122 can process the ground truth label data for utilization in forming a content model for the simulated content. Illustratively, the simulated content service 122 can process the ground truth label according to a priority for identifying/extracting the core ground truth label data that will be used as the basis for the simulated content. Illustratively, the lane edge ground truth labels may be considered to have a high or higher priority. Additional ground truth label data, such as lane lines labels, lane center labels, static object labels, or dynamic object labels, may be associated with low or lower priority with regard to the lane label data or relative to each other. In some embodiments, the label data may be filtered to remove one or more labels (e.g., dynamic objects) that may be replaced by the simulated content or otherwise not required to generate simulated content. For purposes of illustrated, the processed set of ground truth label may be considered the content model attributes that will for the simulated content. Still further, in other embodiments, the simulated content service 122 can utilize pre-configured or templates of standardized ground truth label based on characteristics of the simulated content to be formed. For example, simulated content for vision information captured in an urban environment (e.g., business district) can utilize a template of stationary objects, buildings, signage, traffic lights, etc. that may be considered to be generically present in such a business district.

At (5), the simulated content service 122 generates the model for future generation of the simulated content. Illustratively, the simulated content service 122 can process the collected ground truth label data and prepare the set of ground truth labels for generating variations to form the set of simulated content as described herein. Such processing can include modifications for error adjustment, extrapolation, variation, and the like.

At (6), the simulated content service 122 can generate index data or attribute data (e.g., metadata) for each clip or simulated content data that will facilitate selection, sorting or maintenance of the data. The index or attribute data can include identification of the location, the types of objects simulated, the number of variations that are generated/available, environmental conditions simulated, tracking information, origin source information, and the like. For purposes of FIG. 4A, the simulated content may be generated without specific request/need for the scenarios for forming the training set, which will be described with regard to FIG. 4B.

Referring to FIG. 4B, illustratively, the stored and indexed simulated content information can be provided to the network service 110 as part of training data. At (1), the simulated content service 122 can receive a selection or criteria for selecting the content models (that will be generated or have been previously been generated). Illustratively, a computing device 104 may be utilized to provide criteria, such as sorting criteria. In some embodiments, the request for the simulated content is utilized to provide attributes of the simulated content. Accordingly, the generation of the simulated content can be considered to be responsive to the requests for simulated content in generating the simulated content itself. Thus, the generation of the simulated content may be considered synchronous in nature or dependent in nature. In other embodiments, the request may be a simple selectin of the index values or attributes such that the simulated content service 122 can generate the simulated content based on pre-configure attributes or configurations that are not dependent with the individual requests for simulated content. Accordingly, generation of the simulated content may be considered independent relative to the request.

At (2), the network service 110 can then process the requests and identifies the generated simulated content models, such as via index data. At (3), the simulated content service 122 generates supplemental video image data and associated attribute data. Illustratively, the simulated content system 120 can utilize a set of variables or attributes that can be changed to create different scenarios or scenes for use as supplemental content. For example, the simulated content system 120 can utilize color attributes, types of object attributes, acceleration attributes, action attributes, time of data attributes, location/position attributes, weather condition attributes, and density of vehicle attributes to create various scenarios related to an identified object. Illustratively, the supplemental content can be utilized to emulate real-world scenarios that may be less likely to occur or be measured by the set of vehicles 102. For example, the supplemental content can emulate various scenarios that would correspond to unsafe or hazardous conditions.

The simulated content system 120 may illustratively utilize a statistical selection of scenarios to avoid repetition based on trivial differences (e.g., similar scenarios varying only by color of object) that would otherwise have a potential to bias a machine learning algorithm. Additionally, the simulated content system simulated content service 122 to the number of supplemental content frames and distribution of differences in one or more variables. Illustratively, the output from the simulated content service 122 can include labels (e.g., ground truth information) identifying one or more attributes (e.g., position, velocity and acceleration) that can be detected or processed by the network service 110. In this regard, the simulated content data sets can facilitate detailed labels and can be dynamically adjusted as required for different machine learned training sets. At (4), the simulated content training sets are transmitted to the network service 110.

Turning now to FIG. 4C, once the network service 110 receives the training set, at (1) the network service 110 processes the training sets. At (2), the network service 100 generates an updated machine learned algorithm based on training on the combined data set. Illustratively, the network service 110 can utilize a variety of machine learning models to generate updated machine learned algorithms.

Figure 5:
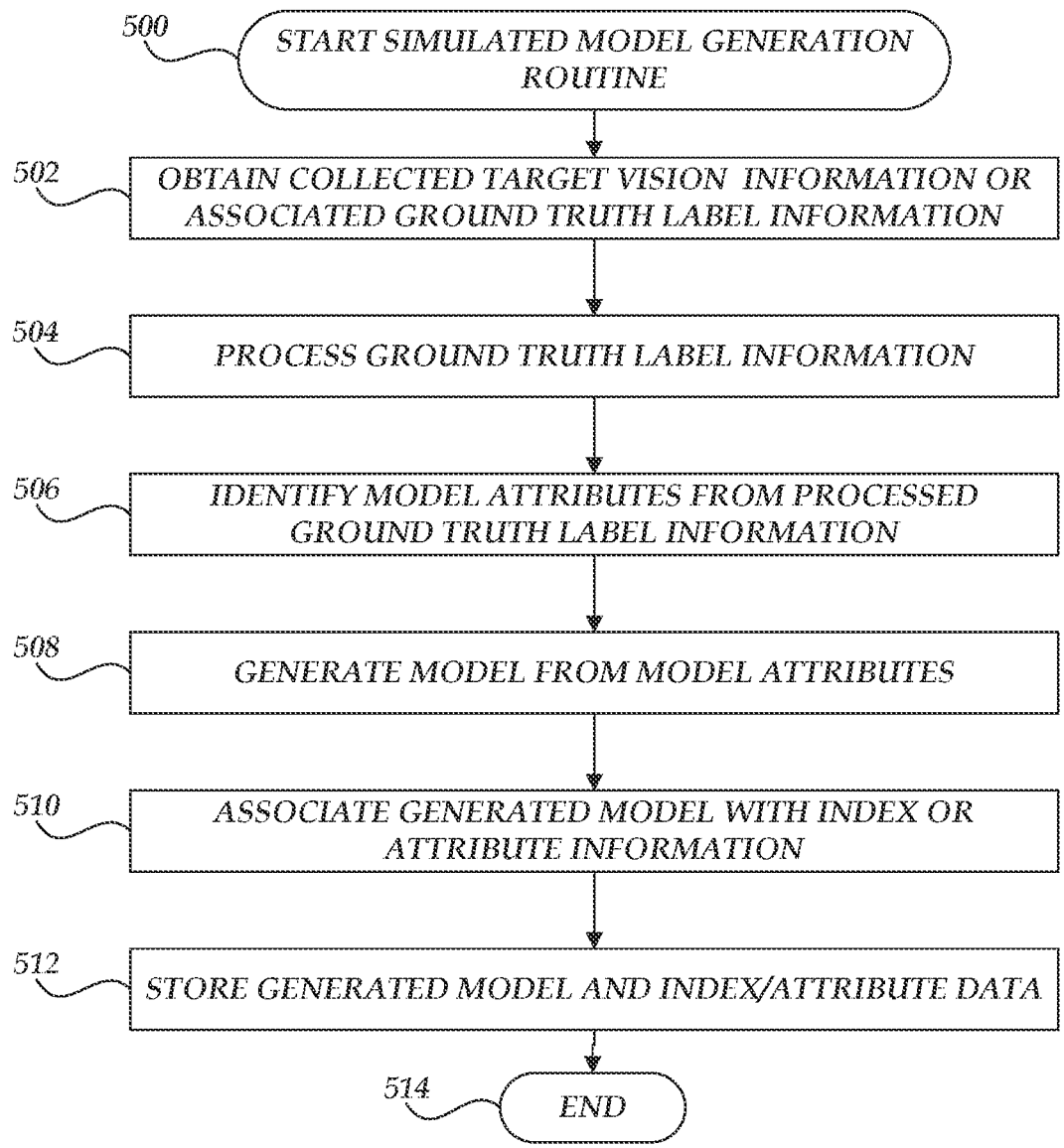
FIG. 5 is a flow diagram illustrative of a simulated model content generation routine implemented by a simulated content service in accordance with illustrative embodiments.

Turning now to FIG. 5, a routine 500 for processing collected vision and simulated content system data will be described. Routine 500 is illustratively implemented by the simulated content service 122. As described above, routine 500 may be implemented after the target vehicle(s) 102 including vision system data and ground truth label data for the captured vision system data is available for processing. Illustratively, the vehicles 102 may be configured to collect vision system data and transmit the collected data and associated ground truth labels. For example, the collected vision system data may be transmitted based on periodic timeframes or various collection/transmission criteria. Still further, in some embodiments, the vehicles 102 may also be configured to identify specific scenarios or locations, such as via geographic coordinates or other identifiers, that will result in the collection and transmission of the collected data. As described above, the vehicles 102 may include processing capabilities in vision systems to generate, at least in part, ground truth label information for the captured vision system information. In other embodiments, the vehicles 102 may transmit captured vision system information (with or without any ground truth labels) to another service, such as in the network 110. The additional services can then add (manually or automatically) ground truth label information. Accordingly, as previously illustrated in FIG. 4A, the collected vision system data may be transmitted to the simulated content service 122 directly from the vehicle 102 or indirectly through the network service 110.

At block 502, the simulated content service 122 receives and processes the collected vision system data and ground truth label information from the vehicles 102 (directly or indirectly). Illustratively, the simulated content service 122 can process the vision-based data, such as to complete lost frames of video data, update version information, error correction, and the like.

At block 504, the simulated content service 122 can optionally process the collected vision system data to identify ground truth labels for the captured video data. In other embodiments, the simulated content service 122 can request or otherwise obtain missing or erroneous ground truth label information from additional sources. In still other embodiments, the simulated content service 122 can obtain just ground truth label information without any associated captured vision system data. Illustratively, the ground truth labels can correspond to any one of a variety of detectable objects that may be depicted in the video data. In one embodiment, the ground truth label data can include information identifying road edges. Additionally, the ground truth label data can include information dependent on the identified road edge, such as lane lines, road centers and one or more stationary objects (e.g., road signs, markers, etc.). Still further, in some embodiments, the ground truth label data can include dynamic object data related to one or more identified objects, such as vehicles, dynamic obstructions, environmental objects, and the like.

At block 506, the simulated content service 122 can process the ground truth label data to identify the model attributes that will form the basis of the simulated content. Illustratively, the simulated content service 122 can process the ground truth label according to a priority for identifying/extracting the core ground truth label data that will be used as the basis for the simulated content. Illustratively, the lane edge ground truth labels may be considered to have a high or higher priority. Additional ground truth label data, such as lane lines labels, lane center labels, static object labels, or dynamic object labels, may be associated with low or lower priority with regard to the lane label data or relative to each other. In some embodiments, the label data may be filtered to remove one or more labels (e.g., dynamic objects) that may be replaced by the simulated content or otherwise not required to generate simulated content. For purposes of illustrated, the processed set of ground truth label may be considered the content model attributes that will for the simulated content. Still further, in other embodiments, the simulated content service 122 can utilize pre-configured or templates of standardized ground truth label based on characteristics of the simulated content to be formed. For example, simulated content for vision information captured in an urban environment (e.g., business district) can utilize a template of stationary objects, buildings, signage, traffic lights, etc. that may be considered to be generically present in such a business district.

At block 508, the simulated content service 122 generates the model for future generation of the simulated content. Illustratively, the simulated content service 122 can process the collected ground truth label data and prepare the set of ground truth labels for generating variations to form the set of simulated content as described herein. Such processing can include modifications for At block 510, the simulated content service 122 can generate index data or attribute data (e.g., metadata) for each clip or simulated content data that will facilitate selection, sorting or maintenance of the data. The index or attribute data can include identification of the location, the types of objects simulated, the number of variations that are generated/available, environmental conditions simulated, tracking information, origin source information, and the like. At block 512, the simulated content service 122 stores the generated content model attributes and identified index and model attributes. Routine 500 terminates at block 514.

Figure 6:
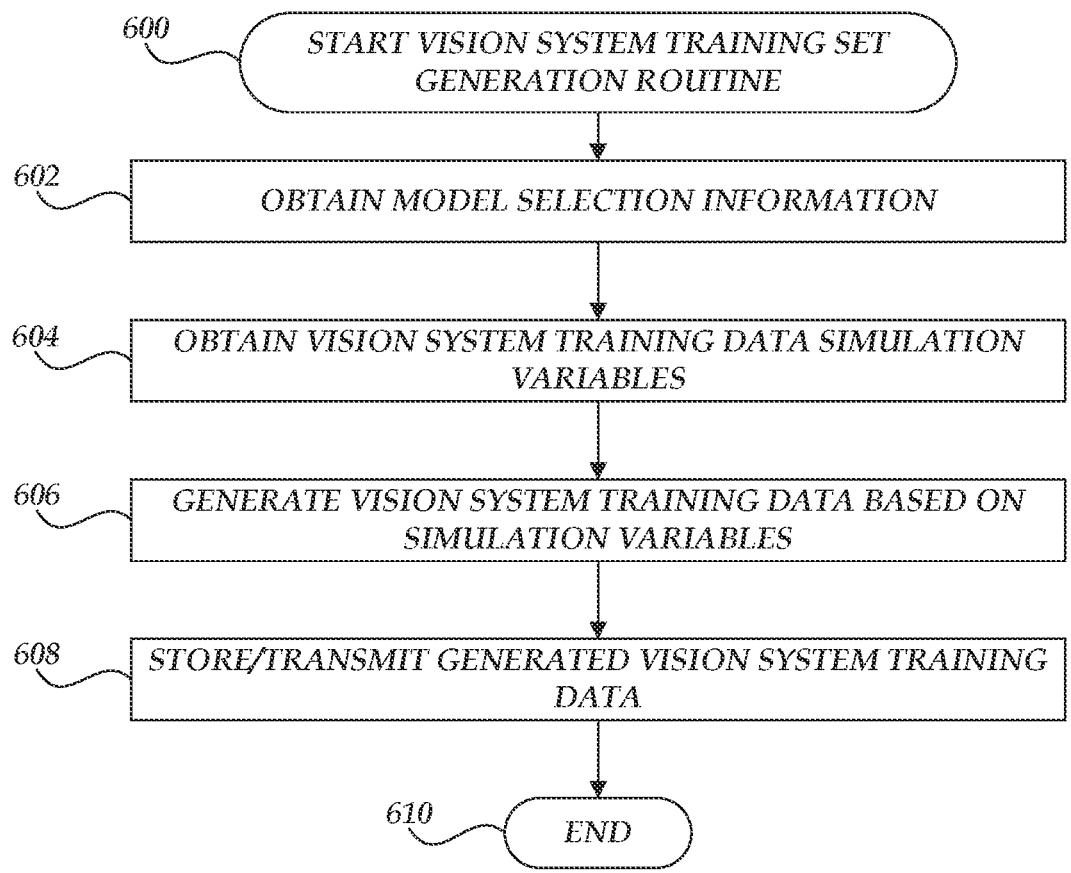
FIG. 6 is a flow diagram illustrative of a vision system training data generation routine based on simulated model content generation routine implemented by a simulated content service in accordance with illustrative embodiments.

Turning now to FIG. 6, a routine 600 for generating updated machine learned algorithms using collected vision and simulated content system data will be described. Routine 600 is illustratively implemented by the simulated content service 122. At block 602, the simulated content service 122 can receive a selection or criteria for selecting the data. Illustratively, a computing device 104 may be utilized to provide criteria, such as sorting criteria. In some embodiments, the request for the simulated content is utilized to provide attributes of the simulated content. Accordingly, the generation of the simulated content can be considered to be responsive to the requests for simulated content in generating the simulated content itself. Thus, the generation of the simulated content may be considered synchronous in nature or dependent in nature. In other embodiments, the request may be a simple selectin of the index values or attributes such that the simulated content service 122 can generate the simulated content based on pre-configure attributes or configurations that are not dependent with the individual requests for simulated content. Accordingly, generation of the simulated content may be considered independent relative to the request.

At block 604, the simulated content service 122 then process the requests and identifies the generated simulated content models, such as via index data. The simulated content service 112 can then identify the attributes or variables that will be used to generate the set of simulated content. Illustratively, the simulated content system 120 can utilize a set of variables or attributes that can be changed to create different scenarios or scenes for use as supplemental content. For example, the simulated content system 120 can utilize color attributes, types of object attributes, acceleration attributes, action attributes, time of data attributes, location/position attributes, weather condition attributes, and density of vehicle attributes to create various scenarios related to an identified object. Illustratively, the supplemental content can be utilized to emulate real-world scenarios that may be less likely to occur or be measured by the set of vehicles 102. For example, the supplemental content can emulate various scenarios that would correspond to unsafe or hazardous conditions.

The simulated content system 120 may illustratively utilize a statistical selection of scenarios to avoid repetition based on trivial differences (e.g., similar scenarios varying only by color of object) that would otherwise have a potential to bias a machine learning algorithm. Additionally, the simulated content system simulated content service 122 to the number of supplemental content frames and distribution of differences in one or more variables. Illustratively, the output from the simulated content service 122 can include labels (e.g., ground truth information) identifying one or more attributes (e.g., position, velocity and acceleration) that can be detected or processed by the network service 110. In this regard, the simulated content data sets can facilitate detailed labels and can be dynamically adjusted as required for different machine learned training sets.

At block 606, the simulated content service 122 generates supplemental video image data and associated attribute data. At block 608, the simulated content training sets are transmitted to the network service 110. In some embodiments, the simulated content service 122 may store the training set or transmit based on specific criteria or subject to request. At block 610, the routine 600 terminates. For purposes of illustrative benefit, the simulated content system 122 can generate training sets for training machine learned algorithms in a manner that is highly efficient and requires significantly less time than traditional methodologies of forming training set data solely from captured vision information or by manually creating simulated content. This generates significant benefit and increased performance of the machine learned algorithms that can be continuously optimized based on any number of criteria determined or provided to the simulated content service 122.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed decision and control algorithms. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer those two elements are directly connected to each other.

Additionally, all numerical terms, such as, but not limited to, "first", "second", "third", "primary", "secondary", "main" or any other ordinary and/or numerical terms, should also betaken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A system for managing vision systems in vehicles, the system comprising:
   a plurality of vehicles including systems for generating and processing vision data captured from one or more vision systems according to at least one machine learned algorithm, wherein the vision data captured from one or more vision systems is associated with ground truth labels;
   one or more first computing systems including first processing devices and first memory, that execute first computer-executable instructions, for implementing a vision system information processing component that is operative to generate the at least one machine learned algorithm for execution by the plurality of vehicles, the at least one machine learned algorithm generated from a set training data; and
   one or more second computing systems including second processing devices and second memory, that execute second computer-executable instructions, for implementing a simulated content generation service operative to:
      obtain ground truth label data associated with collected vision data from one or more of the plurality of vehicles;
      process the obtained ground truth label data associated with the collected vision data to form selected ground truth label data for use in generating a content model, wherein the formation of the selected ground truth label data is based on an ordered priority of content model attributes to generate simulated model content;
      associate at least one of index data or content model attribute data based on the generated simulated model content; and store the generated simulated model content and the at least one of index data and content model attribute data.

2. The system as recited in claim 1, wherein the formation of the selected ground truth label data includes identifying ground truth label data corresponding to road edges.

3. The system as recited in claim 2, wherein the formation of the selected ground truth label data includes subsequent identifying ground truth label data corresponding to at one static object based on identified road edges.

4. The system as recited in claim 3, wherein the static object corresponds to lane lines based on the identified road edges.

5. The system as recited in claim 3, wherein the static object corresponds to lane center based on the identified road edges.

6. The system as recited in claim 3, wherein the static object corresponds to stationary objects based on the identified road edges.

7. The system as recited in claim 2, the formation of the selected ground truth label data includes subsequent identifying ground truth label data corresponding to at least one dynamic object based on identified road edges.

8. The system as recited in claim 1, wherein the simulated content generation service filters at least one around truth label from the obtained ground truth label data.

9. The system as recited in claim 1, wherein the index data corresponds to geo hash information.

10. The system as recited in claim 1, the formation of the selected ground truth label data, includes including at least one additional ground truth label, wherein the at least one additional ground truth label is based on a selected template, to.

11. A method for managing vision systems in vehicles, the system comprising:
  obtaining ground truth label data associated with collected vision data, the collected vision data corresponding to vision systems on a vehicle;
  identifying one or more content model attributes based on the obtained ground truth label data;
  processing the one or more content model attributes based on an ordered priority of content model attributes to identify a subset of the content model attributes;
  generating simulated model content based on the subset of the content model attributes; and
  storing the generated simulated model content.

12. The method as recited in claim 11 further comprising associating at least one of index data or content model attribute data based on the generated simulated model content.

13. The method as recited in claim 12, wherein the index data corresponds to geo hash information.

14. The method as recited in claim 11, wherein the content model attribute data is associated with at least one static object depicted in the simulated content.

15. The method as recited in claim 11, wherein identifying one or more content model attributes based on the obtained ground truth label data includes identifying at least road edges in identifying the one or more content model attributes.

16. The method as recited in claim 15, wherein identifying one or more content model attributes based on the obtained ground truth label data includes subsequently identifying at one static object based on identified road edges.

17. The method as recited in claim 16, wherein the static object corresponds to at least one of lane lines based on the identified road edges, lane center based on the identified road edges, or stationary objects based on the identified road edges.

18. The method as recited in claim 15, wherein identifying one or more content model attributes based on the obtained ground truth label data supplementing at least one ground truth label based on a pre-configuration of around truth labels.

19. A method for managing vision systems in vehicles, the system comprising:
  obtaining generated ground truth label data associated with collected vision data, the collected vision data associated with visions systems on vehicles;
  processing the obtained ground truth label data associated with the collected vision data to form a first set of ground truth label data for use in generating a content model;
  further processing the ground truth label data associated with the collected vision data to form additional ground truth label data for use in generating a content model, wherein the additional ground truth label data is dependent on the first set of ground truth label data;
  generating simulated model content based on the first and second sets of ground truth label data; and
  storing the generated simulated model content.

20. The method as recited in claim 19 further comprising associating at least one of index data or content model attribute data based on the generated simulated model content.

21. The method as recited in claim 19, wherein the first set of ground truth data includes at least road edges in identifying one or more content model attributes.

22. The method as recited in claim 19, wherein the second set of ground truth data includes at least one static object based on the first set of ground truth data.

23. The method as recited in claim 22, wherein the static object corresponds to at least one of lane lines based on identified road edges, lane center based on the identified road edges, or stationary objects based on the identified road edges.

24. The method as recited in claim 22 further comprising further processing the ground truth label data associated with the collected vision data to form second additional around truth label data for use in generating a content model, wherein the second additional ground truth label data is based on at least one of a template or pre-configured selection of around truth label data.

* * * * *